United States Patent
Yu (10) Patent No.: US 6,909,576 B2
(45) Date of Patent: Jun. 21, 2005

(54) METHOD, SYSTEM, AND PROGRAM FOR GENERATING CONTROL SIGNALS TO PERFORM A SEEK OPERATION

(75) Inventor: Mantle Man-Hon Yu, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 260 days.

(21) Appl. No.: 10/227,042

(22) Filed: Aug. 22, 2002

(65) Prior Publication Data

US 2004/0037000 A1 Feb. 26, 2004

(51) Int. Cl.$^7$ ............................................. G11B 5/596
(52) U.S. Cl. ................................ 360/78.07; 360/78.04
(58) Field of Search ........................... 360/78.06, 78.07, 360/78.08, 78.09, 77.04, 78.04, 234.3; 700/29, 245

(56) References Cited

U.S. PATENT DOCUMENTS

| | | | |
|---|---|---|---|
| 4,894,599 A | | 1/1990 | Ottesen et al. |
| 4,982,298 A | * | 1/1991 | Volz et al. ............... 360/78.06 |
| 5,166,845 A | * | 11/1992 | Thompson et al. ...... 360/234.3 |
| 5,347,446 A | * | 9/1994 | Iino et al. ..................... 700/29 |
| 5,465,035 A | | 11/1995 | Scaramuzzo, Jr. et al. |
| 5,638,267 A | | 6/1997 | Singhose et al. |
| 5,696,647 A | * | 12/1997 | Phan et al. ............... 360/78.07 |
| 5,760,992 A | * | 6/1998 | Phan et al. ............... 360/78.07 |
| 5,793,555 A | | 8/1998 | Belser et al. |
| 5,859,742 A | | 1/1999 | Takaishi |
| 6,031,683 A | * | 2/2000 | Iverson et al. ........... 360/78.04 |
| 6,148,240 A | | 11/2000 | Wang et al. |
| 6,166,876 A | | 12/2000 | Liu |
| 6,178,060 B1 | * | 1/2001 | Liu .......................... 360/78.07 |
| 6,195,222 B1 | * | 2/2001 | Heminger et al. ........ 360/78.07 |
| 6,256,163 B1 | * | 7/2001 | Schmidt et al. .......... 360/78.09 |
| 6,294,891 B1 | | 9/2001 | McConnell et al. |
| 6,314,473 B1 | | 11/2001 | Singer et al. |
| 6,341,246 B1 | * | 1/2002 | Gerstenberger et al. .... 700/245 |
| 6,504,670 B1 | * | 1/2003 | Dittmar .................... 360/78.07 |
| 6,614,617 B1 | * | 9/2003 | Galloway ................ 360/78.06 |

* cited by examiner

Primary Examiner—David Hudspeth
Assistant Examiner—Fred F. Tzeng
(74) Attorney, Agent, or Firm—David W. Victor; Konrad Raynes & Victor, LLP (57) ABSTRACT

Provided are a method, system, and program for initializing a storage device. A pulse response profile is determined for a storage system in response to a series of signals generated to seek to a location in the storage system. A determination is made of a desired response trajectory for the storage system that optimizes seek performance. An adjustment vector is calculated based on the pulse and step response profiles and the desired response trajectory to optimize the pulse response profile. The adjustment vector is stored in the storage device for use during storage device operations to apply to control signals generated to perform one seek operation.

38 Claims, 6 Drawing Sheets

Pulse Response Matrix

Pulse

| | 0 | 1 | 2 | 3 | 4 | 5 | 6 |
|---|---|---|---|---|---|---|---|
| 0 | -0.394 | 0 | 0 | 0 | 0 | 0 | 0 |
| 1 | -0.534 | -0.394 | 0 | 0 | 0 | 0 | 0 |
| 2 | -2.906 | -0.534 | -0.394 | 0 | 0 | 0 | 0 |
| 3 | -25.982 | -2.906 | -0.534 | -0.394 | 0 | 0 | 0 |
| 4 | -78.802 | -25.982 | -2.906 | -0.534 | -0.394 | 0 | 0 |
| 5 | -123.348 | -78.802 | -25.982 | -2.906 | -0.534 | -0.394 | 0 |
| 6 | -153.486 | -123.348 | -78.802 | -25.982 | -2.906 | -0.534 | -0.394 |
| 7 | -161.096 | -153.486 | -123.348 | -78.802 | -25.982 | -2.906 | -0.534 |
| 8 | -143.55 | -161.096 | -153.486 | -123.348 | -78.802 | -25.982 | -2.906 |
| 9 | -123.878 | -143.55 | -161.096 | -153.486 | -123.348 | -78.802 | -25.982 |
| 10 | -100.488 | -123.878 | -143.55 | -161.096 | -153.486 | -123.348 | -78.802 |
| 11 | -79.624 | -100.488 | -123.878 | -143.55 | -161.096 | -153.486 | -123.348 |
| 12 | -49.988 | -79.624 | -100.488 | -123.878 | -143.55 | -161.096 | -153.486 |
| 13 | -26.722 | -49.988 | -79.624 | -100.488 | -123.878 | -143.55 | -161.096 |
| 14 | -7.208 | -26.722 | -49.988 | -79.624 | -100.488 | -123.878 | -143.55 |
| 15 | 7.802 | -7.208 | -26.722 | -49.988 | -79.624 | -100.488 | -123.878 |

METHOD, SYSTEM, AND PROGRAM FOR GENERATING CONTROL SIGNALS TO PERFORM A SEEK OPERATION

BACKGROUND OF THE INVENTION

1. Field of the Invention

The present invention relates to a method, system, and program for generating control signals to perform a seek operation.

2. Description of the Related Art

Computer hard disk drives include one or more disks of magnetic storage medium and a disk drive head assembly to read and write data on the magnetic storage medium. Magnoresistive (MR) heads typically include a write element comprised of a thin film inductive head and a read element comprised of a sensor. MR heads for the disk surfaces of the disk drive are affixed to an actuator or arm that glides across the disk surface to position the head at different track locations. Current is passed to a voice coil motor (VCM) to position the actuator with respect to the disk surface. The amount of torque applied to the actuator is governed by the amount of current in the VCM. The VCM comprises the coil that receives the current and two magnets. During operations, the disk drive components, such as the VCM, can produce vibrations and oscillations induced as a result of the resonance of the components. Such vibrations may result in undesirable head variations and tracking errors.

Two factors that effect the access time that lapses before the head can access the disk include seek and settle time. The seek time is the time required for the head to move between tracks. The settle time is the amount of time required, after the actuator has moved the head assembly during a seek, for the heads to stabilize sufficiently for the data to begin to be read or write. The characteristics of the disk drive system and environment can produce oscillations that may increase the settle time and thereby degrade disk performance. Further, error may result if the head overshoots or undershoots the desired track.

In current disk drive systems, to correct for tracking errors resulting from noise and vibrations from components such as the VCM, the disk drive controller will read servo information indicating the actual current position and compare that value read to the desired position. This difference is known as the Position Error Signal (PES). The drive controller will then calculate a current to apply to the VCM to correct any variation in the measured position versus desired position. Thus, the current supplied to the VCM to apply torque to the actuator arm is a function both of the amount of current in the voice coil supplied by an amplifier controlled by the drive controller and by position feedback adjustments based on position information read from the data heads.

Notwithstanding the current efforts to reduce the seek and settle time, there is a continued need in the art to provide further techniques to optimize the seek and settle time of the file system.

SUMMARY OF THE PREFERRED EMBODIMENTS

Provided are a method, system, and program for initializing a storage device. A pulse response profile and step response profile are determined for a storage system in response to a series of signals generated to seek to a location in the storage system. A determination is made of a desired response trajectory for the storage system that optimizes seek performance. An adjustment vector is calculated based on the pulse and step response profiles and the desired response trajectory to optimize the pulse response profile. The adjustment vector is stored in the storage device for use during storage device operations to apply to control signals generated to perform one seek operation.

In further implementations, computing the adjustment vector comprises determining adjustment vector values capable of adjusting the pulse response profile to more closely approximate the desired response trajectory.

Further provided are a method, system, and program for generating control signals to perform a seek operation to move an Input/Output (I/O) mechanism to a location on a storage medium in a storage device. Control signals are generated to perform a seek operation. An adjustment vector in the storage device is accessed to determine one adjustment value. The generated control signal is adjusted with the determined adjustment value and the adjusted control signal is transmitted to move the Input/Output head to the seek location on the storage medium.

In further implementations, the adjustment vector includes one adjustment value for each control signal generated to perform the seek operation.

Still further, the control signals may be generated by a closed loop servo system.

The described implementations provide techniques for generating adjustment control vectors to adjust seek operation control signals to improve the accuracy of the actuator assembly movement and reduce seek and settle time.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
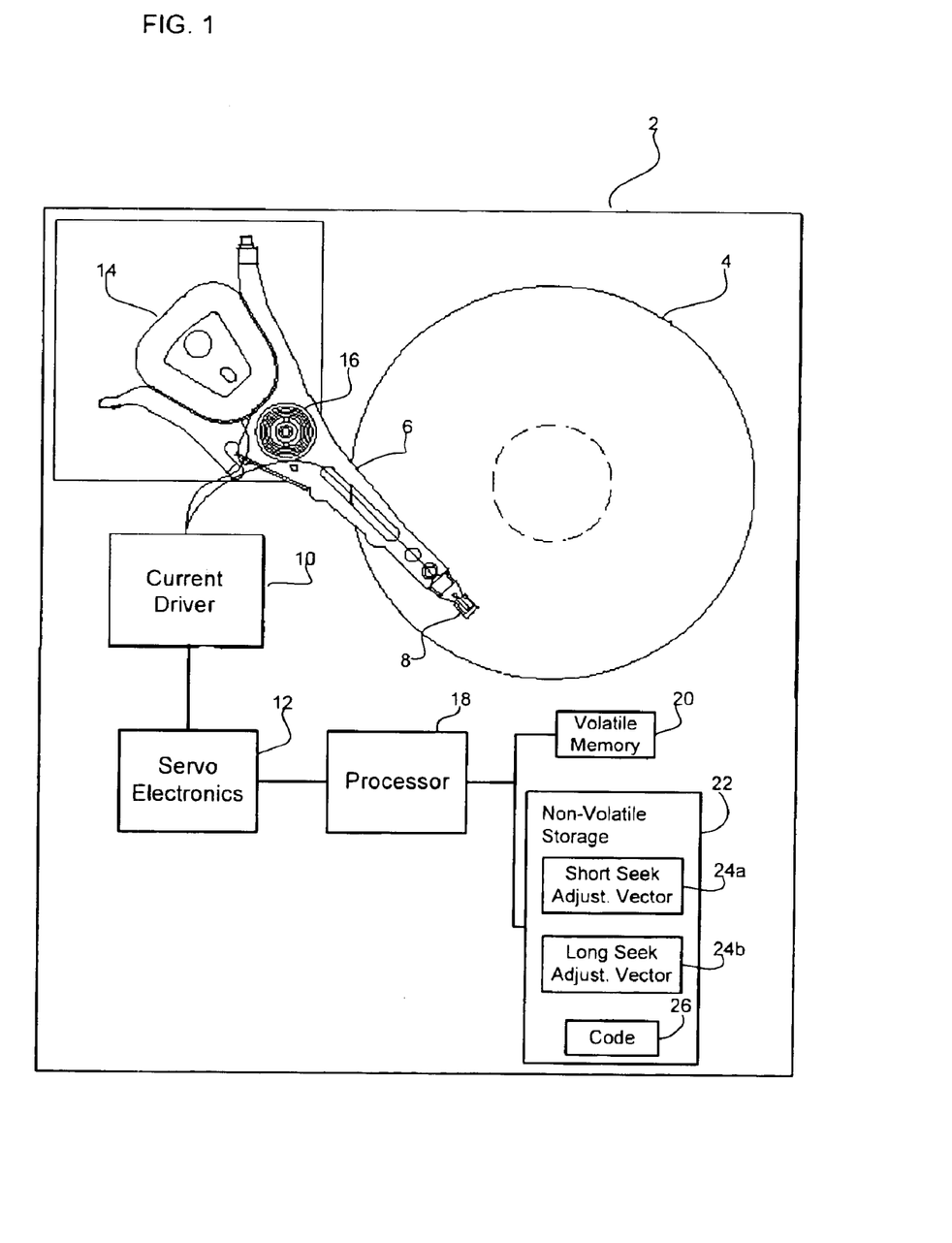
FIG. 1 illustrates a disk drive architecture in which aspects of the invention are implemented.

FIG. 1 illustrates a disk drive system 2, including one or more rotating disks 4 (only one is shown), an actuator assembly 6 to move a head assembly 8 across the disk 4 surface. The disk drive system 2 further includes a current driver 10 that converts the digital signal of a calculation from servo electronics 12 or processor 18 to actual current that is applied to a voice coil motor (VCM) 14. The VCM 14 comprises a coil that sits between two magnets. The current driver 10 applies current to the VCM 14 to cause the coil to react and move through a magnetic field to move the actuator 6.

In certain implementations, the head 8 is a magnetoresistive (MR) head device. However, in alternative implementations, the head 8 may be constructed of other materials known in the art. The servo electronics 12 provides a closed loop feedback system to insure that the head follows the tracks accurately and to control smooth transitions when the head "seeks" from one track location to another track. The servo electronics 12 calculates the position error signal (PES) from the actual position data and from pre-recorded servo information either on a dedicated servo disk or on servo sectors interspersed among the data sectors on the disk. The servo electronics 12 uses the servo information to determine PES, which is the signal proportional to the difference between the ideal center line tracking and the actual positions of the head assembly 8. The servo electronics 12 may then calculate a corrective position signal based on the PES. The actuator 6 pivots around a shaft 16 in response to the torque produced by the VCM 14.

A processor 18 manages read/write operations and controls other disk operations. The processor 18 utilizes a volatile memory 20, such as a random access memory (RAM) or registers as a working memory in which instructions and data are temporarily loaded for program execution. A non-volatile storage 22, such as a read-only memory (ROM), programmable ROM (PROM), electronically programmable ROM (EPROM), flash memory, etc., stores program instructions and constants, referred to as code 26, loaded and executed by the processor 18 to perform the disk drive operations. Alternatively, the code 26 described herein as performed by processor 18 along with the volatile memory 20 and non-volatile storage 22 may be implemented as hardware, such as an Application Specific Integrated Circuit (ASIC).

The non-volatile storage 22 further includes a short seek adjustment vector 24a and a long seek adjustment vector 24b, providing adjustment pulses that are added to the signal generated by the servo electronics 12 to optimize the seek and settle time and help reduce overshoot or undershoot problems. In certain implementations, the servo-electronics 12 comprises a closed loop system that generates control signals to position the actuator assembly 6 to different tracks. In a manner known in the art, the servo electronics 12 may calculate the Position Error Signal (PES) to adjust the control signal to reduce the PES. Further, the processor 18 would apply one adjustment value from one of the short seek adjustment vector 24a or long seek adjustment vector 24b to the control signal. In this way, the control signal is adjusted by predetermined adjustment pulses or values that minimize seek and settle time during seek operations. Thus, for seeks that are deemed to be short seeks, such as seeks for less than 32 tracks, the adjustment pulses applied would comprise one value from the short seek adjustment vector 24a and for seeks deemed to be long seeks, such as seeks for more than 32 tracks, the adjustment pulses applied would comprise one value from the long seek adjustment vector 24b.

Figure 2:
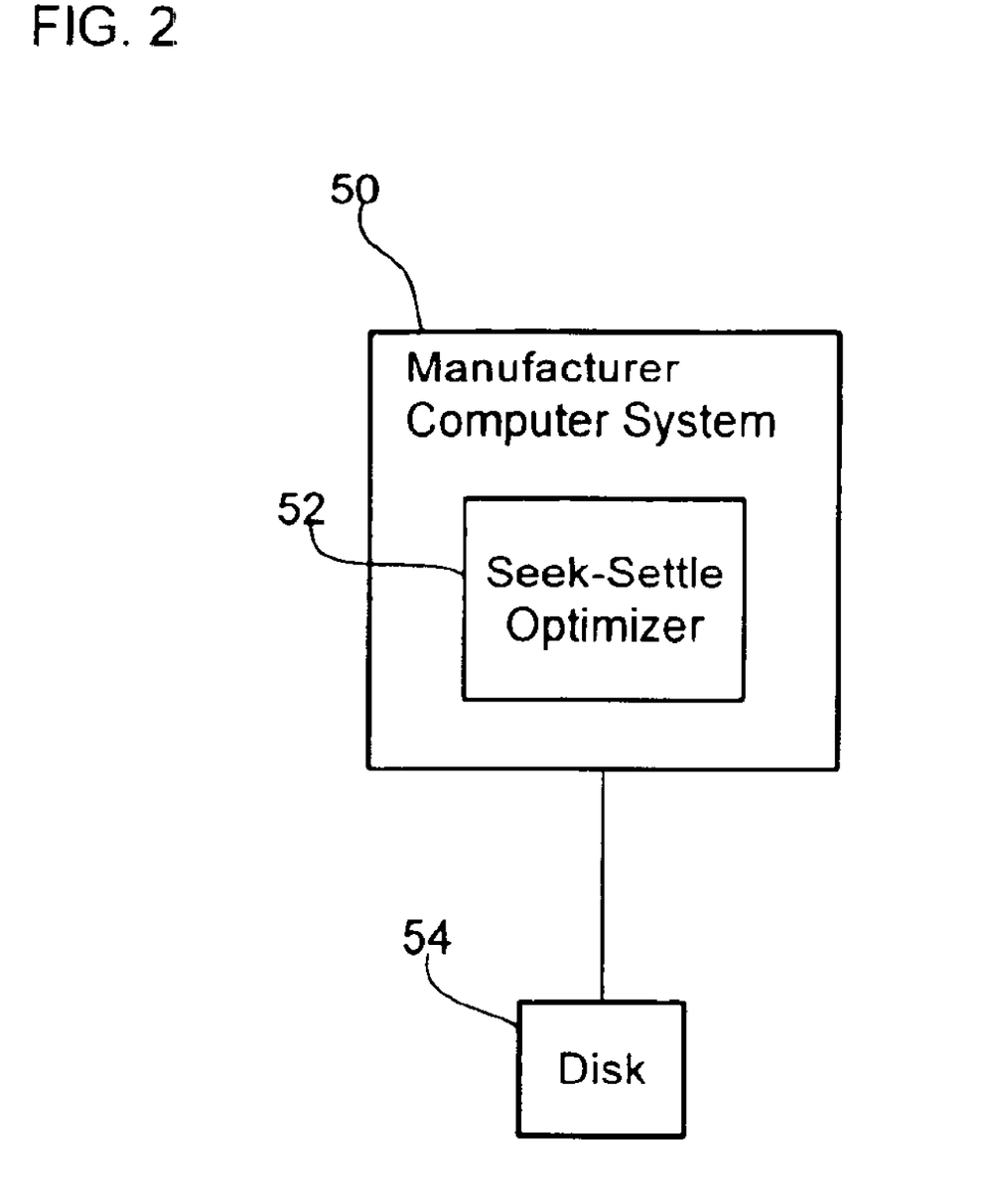
FIG. 2 illustrates a computing environment in which aspects of the invention may be implemented.

During disk manufacture, the disk vendor would perform a series of tests on each disk to determine the short 24a and long 24b seek adjustment vectors to use during disk operations to improve seek and settle performance. FIG. 2 illustrates an implementation where a manufacturer computer system 50 includes a seek-settle optimizer 52 to generate the short 24a and long 24b seek adjustment vectors to encode in the non-volatile memory 22 of a disk 54, such as the disk 2 shown in FIG. 1, coupled to the manufacture computer system 50. The adjustment vectors 24a, 24b would then be used during normal customer operations. The optimizer 52 may operate in response to input received directly from the disk 54 or from user input during the optimization process.

Figure 3:
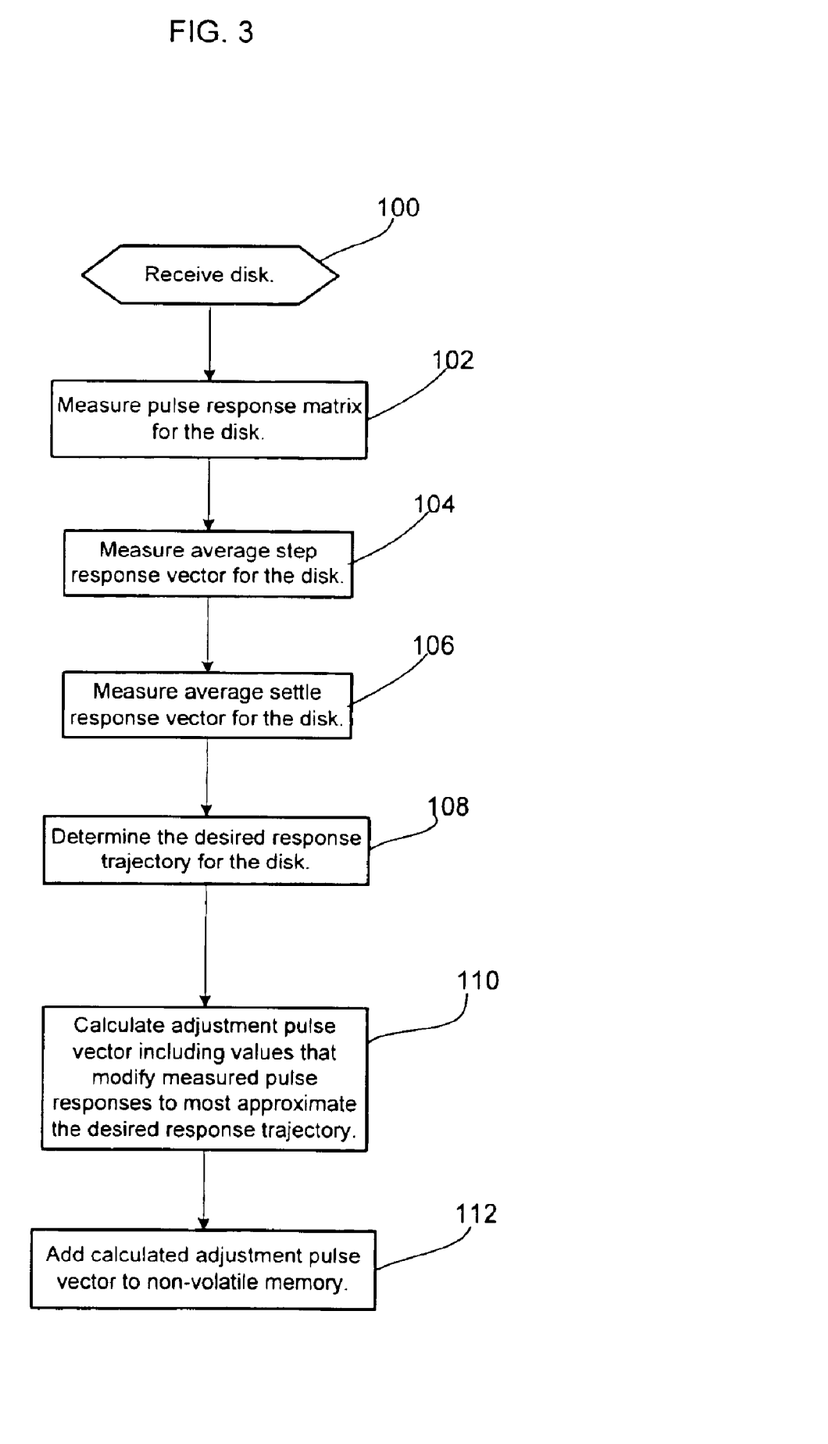
FIG. 3 illustrates logic to generate an adjustment vector.

FIG. 3 illustrates the operations implemented in the seek settle optimizer 52 with respect to a given disk to generate the adjustment vectors 24a and 24b for that disk 54. Upon receiving (at block 100) a disk during the manufacturer process, the optimizer 52 would determine (at block 102) a pulse response profile of the disk, a step response profile of the disk (at block 104), and a settle response profile of the disk (at block 106). The pulse response profile is used to construct a response matrix. This pulse response profile may comprise a matrix of measured PES responses, where the PES is measured from samples of control signals at a known amplitude. The step response vector is a measurement similar to the pulse response vector. However, instead of a pulse input, a step input to seek a track is used. A typical step size used is equal to 1 track pitch. A step response is the input signal to move the head 8 (FIG. 1) to do a one track seek, without any adjustment signal. The adjustment pulses incorporate the step response to more approximate a desired response, having a more optimized settle profile. The pulse response is the same for long and short seeks. The one pulse response is the result of applying the adjustment signal, which is a sequence of pulses, where the sequence of pulses is the difference between desired and measured response.

Figure 4:
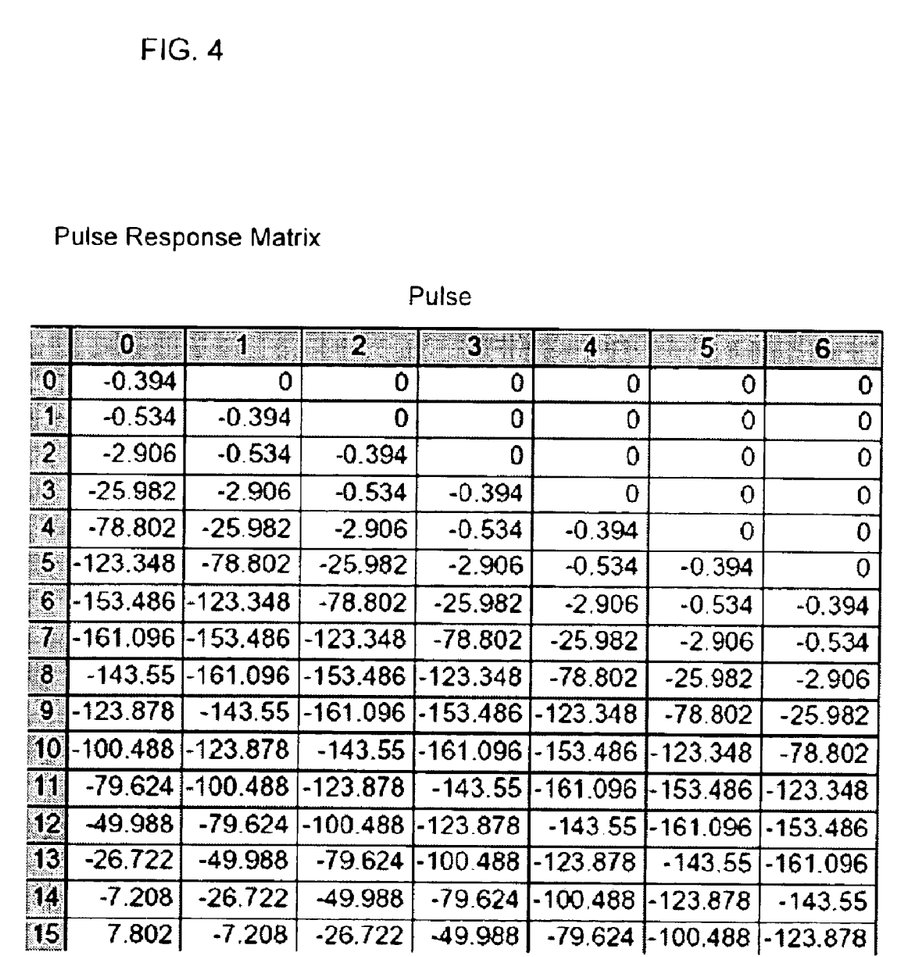
FIG. 4 illustrates an example of a pulse response matrix used in implementations of the invention.

FIG. 4 illustrates an example of an m×n pulse response matrix measuring the PES responses to control signals to perform a seek operation. Each column j indicates a PES response vector indicating PES responses at different points in time i, where i is the row number. Each PES response vector j is measured in response to a control signal sent at time j, where j is the column number. The servo electronics 12 would generate n control signals to perform a single seek, where n is the number of columns j in the response matrix. Each PES response vector j, for j equals 0–n, has m entries indicating a time the PES response was measured.

After determining the pulse and step response profile, the optimizer 52 then determines (at block 108) a desired response trajectory. The desired response trajectory may comprise a vector of the desired PES trajectory for the disk, where a different PES trajectory may be used for short seeks and long seeks. The desired PES trajectory is selected to minimize both seek and settle time for the particular disk. The desired PES trajectory may be maintained in the optimizer 52 code. The desired response trajectory is based on the characteristics of the disk and provides an optimal PES trajectory assuming full acceleration.

Figure 5:
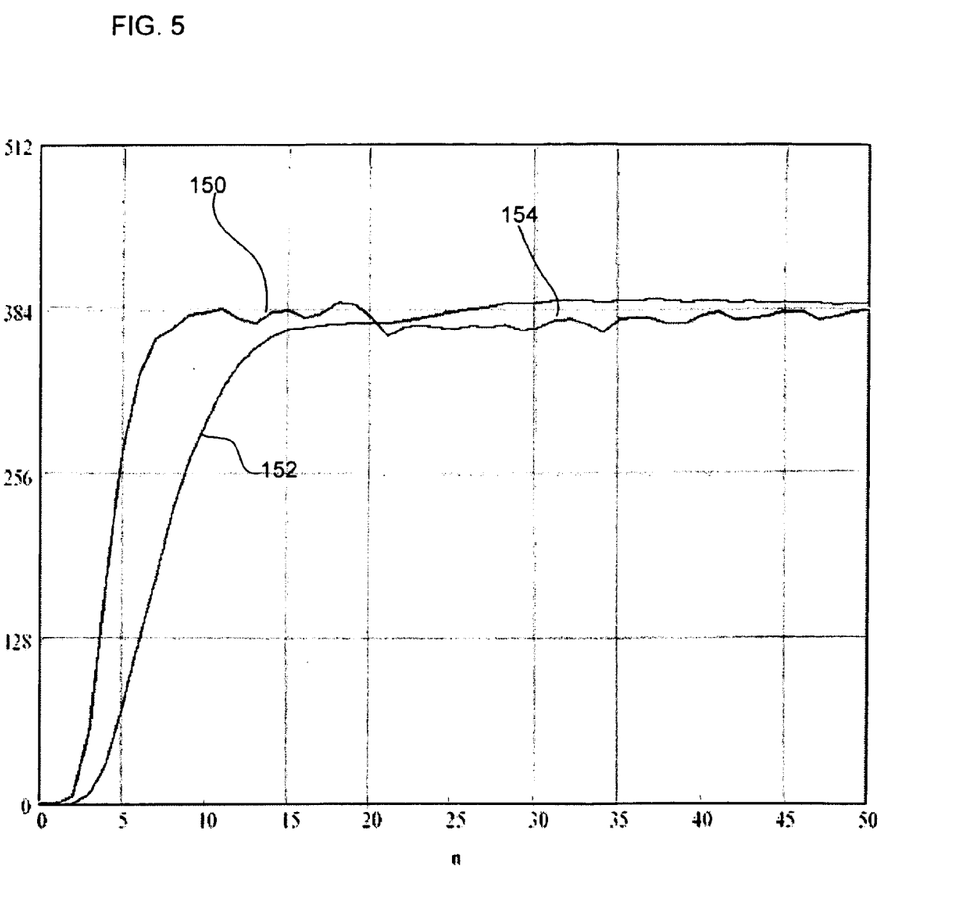
FIG. 5 illustrates a graph of seek response curves showing movement of a head toward a target location in response to control signals in accordance with implementations of the invention.

FIG. 5 illustrates head movement trajectories 150, 152, 154 showing the PES during a seek of a single track from 0 to 384, where the horizontal axis indicates the sample number or time a location is reached where the measurement is made, and the vertical axis indicates a location j reached at the sampled measurement, where the target location is 384. In certain implementation, each sample on the horizontal axis may comprise a 20 microsecond increment. Trajectory 150 is a desired trajectory, where the seek location 384 is reached quickly. The desired PES trajectory 150 seeks to minimize the settle time as indicated by the occurrence of a flat line at the target location 384 after a relatively few number of samples. The flat line at the target location 384 indicates no PES and oscillation when the head seeks and settles at the location. The measured step response trajectory at block 104 is shown as trajectory 152. The difference between the step response trajectory 152 and the desired trajectory 150 comprises the PES, where the algorithm attempts to minimize the difference with the desired trajectory 150.

The determined (at block 110) adjustment pulse vector 24*a* may be applied to the measured pulse response matrix, such as the matrix shown in FIG. 4, to produce a result matrix or trajectory that most approximates the desired PES trajectory 150. In certain implementations, the optimizer 52 would find a least squares solution by first determining a difference vector q shown below in equation (1):

$$q_i = -(\text{step}_i - \text{ref}) \tag{1},$$

where $q_i$ is a vector measured at time i, for i equals $0^-$ to n, where n corresponds to the number of control signals the servo electronics 12 generates during a seek, which corresponds to the number of columns in the pulse response matrix shown in FIG. 4. The $\text{step}_i$ variable comprises the PES vector in column i from the measured step response matrix, and "ref" comprises the desired PES trajectory vector. The "q" calculated in equation (1) above is for short seeks. For long seeks, q=settle−ref, where settle is the settle response. Thus, different "q" vectors are calculated for long versus short seeks. As discussed, the pulse response is used for all seeks, and the step response is just for short seeks.

A pseudo-inverse may be performed on the measured pulse response matrix (p) to produce pinv as shown below in equation (2):

$$\text{pinv} = (p^T \cdot p)^{-1} \cdot p^T \tag{2}$$

The pinv is the psuedo inverse of the pulse response and is the same value for long and short seek. The pulse response (p) is the characteristic of how the signal moves. A vector of n optimized adjustment pulses (opt), one for each of the signals generated during the seek, may then be calculated from equation (3) below:

$$\text{opt} = \text{pinv} \cdot q \tag{3}$$

In FIG. 5, the adjusted PES signal that results from applying an adjustment pulse for a short seek to the measured step response 152 at time i, for i equals 0 to m is shown as adjusted PES signal 154. As shown in FIG. 5, the adjusted PES signal 154 closer approximates the desired PES trajectory 150, and thus produces a more optimal control signal that closer approximates the desired PES profile for that disk. Further, the adjusted PES signal 154 has a better seek and settle time and sooner settles closer to the target seek location 384 than the non-adjusted PES signal 152.

After generating the adjustment pulse vector, the optimizer 52 would write (at block 112) the determined adjustment pulse vector to the disk non-volatile memory 22 as short seek 24*a* or long seek 24*b* adjustment vectors. The adjustment pulse vectors may be part of the disk microcode.

As discussed, different desired trajectories may be used for determining the short seek 24*a* and long seek 24*b* adjustment pulses due to the particular characteristics of short versus long seeks. The goal trajectory for long seeks differs in that for long seeks, the maximum acceleration for saturation occurs at the beginning of the signal to initially move faster for the longer seek, whereas for a short seek, less acceleration is applied at the beginning of the signal. Further, in certain implementations, a long seek adjustment value from vector 24*b* may be applied at the end of the pulse and a short seek adjustment value from vector 24*a* may be applied at the beginning of the pulse.

The described implementations provide techniques to optimize the seek and settle time by generating adjustment pulse vectors to store with the disk microcode. During customer disk operations, the values in the adjustment pulse vectors are applied to control signals generated by the servo-electronics during the seek to adjust the seek control signals to have a pulse response that closer approximates a desired PES trajectory.

Figure 6:
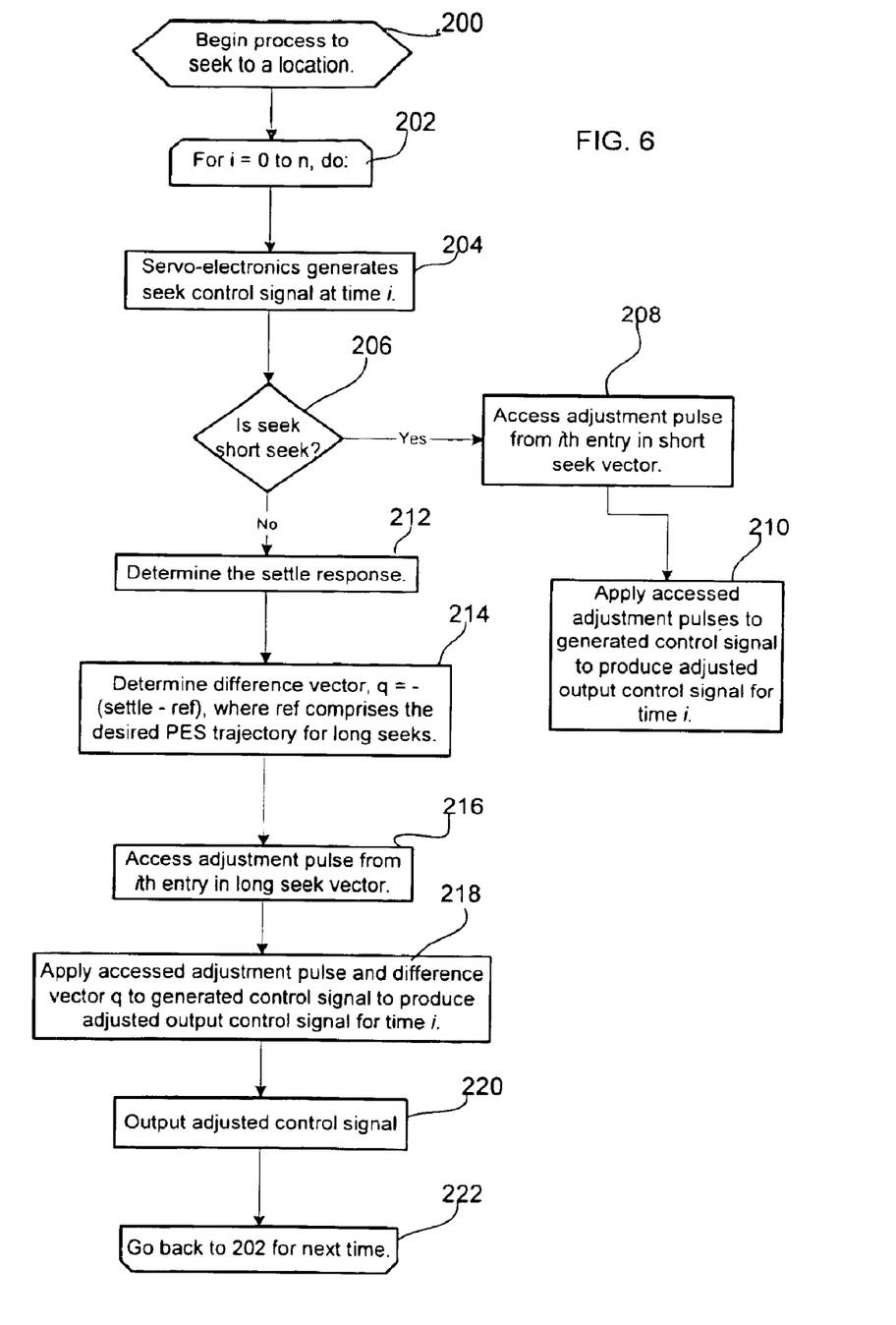
FIG. 6 illustrates logic to use the adjustment vector generated with the logic of FIG. 3 to generate adjusted control signals to perform the seek operation.

FIG. 6 illustrates logic implemented in the code 26 executed by the processor 18 to generate adjusted output control signals to the current driver 10 in accordance with implementations of the invention. Control begins at block 200 where the process begins to generate n control signals to seek to a target location on the disk 4. The processor 18 performs a loop at blocks 202–216 for each control signal generated at time i, where i equals 0 to n−1 where n is the number of control signals generated to implement the seek. The servo electronics 12 generates (at block 204) a control signal at time i in a manner known in the art, where the generated control signal may include PES error adjustment. If (at block 206) the seek is a short seek, then the processor 18 accesses (at block 208) the adjustment pulse from the ith entry in the short seek pulse vector 24*a*, wherein some threshold number of tracks involved in the seek delineates a short seek from a long seek. The accessed adjustment pulse is applied (at block 210) to the generated control signal to produce adjusted output control signal for time i.

If (at block 206) the seek is a long seek, then the processor 18 determines (at block 212) the settle response and then determines (at block 214) the difference vector q=−(settle−ref), where "ref" comprises the desired PES trajectory for long seeks and "settle" is the settle response. The processor 18 further accesses (at block 216) the adjustment pulse from the ith entry for long seek vector and applies (at block 218) the accessed adjustment pulse and difference vector q to generated control signal to produce adjusted output control signal for time i. The processor 18 then outputs (at block 220) the adjusted output signal to the current driver 10 to control the VCM 16.

The described implementations thus provide techniques to generate an adjustment pulse vector that when applied to control signals generated during the seek operations will optimize the seek and settle time by minimizing the PES around a desired PES trajectory.

Additional Implementation Details

The described logic for determining adjustment pulses and using such adjustment pulses in disk drive operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.) Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the optimizer 52 code is implemented in a computer system external to the disk drive and performed during the manufacturing process. In alternative implementations, the optimizer code may be implemented in the code 26 of the disk 2 and executed to generate adjustment pulses during disk initialization of the disk 2 in the customer system. This allows for the adjustment pulses to be modified when the disk is installed or subsequently initialized.

The described implementations included a specific equation for use in estimating the adjustment pulses based on a desired PES trajectory and the measured pulse responses. In alternative implementations, different equations related to acceleration may be used to estimate the adjustment vectors.

In the described implementations, there were two sets of adjustment pulses, one for short seeks and one for long seeks. In alternative implementations, there may be only one set of adjustment pulses for all seeks, regardless of length, or more than two sets of adjustment pulses to apply to different ranges of seek lengths to provide a more fine grained adjustment of the control signals.

Certain implementations were described with respect to MR heads. However, the head assembly 8 may be implemented with read and/or write heads other than MR heads, e.g., ferrite, MIG, thin film, GMR, one-sided, two-sided, etc., to determine non-mechanical noise arising from structural defects The described implementations may be implemented in disk drives that include multiple platters and multiple heads to read from one or both surfaces of each platter.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for initializing a storage device, comprising:
    determining a step response profile and pulse response profile for a storage system in response to a series of signals generated to seek to a location in the storage system;
    determining a desired response trajectory for the storage system that optimizes seek performance;
    computing an adjustment vector based on the pulse and step response profiles and the desired response trajectory to optimize the pulse response profile; and
    storing the adjustment vector in the storage device for use during storage device operations to apply to control signals generated to perform one seek operation.

2. The method of claim 1, further comprising:
    generating a first adjustment vector for a short seek; and
    generating a second adjustment vector for a long seek, wherein the first and second adjustment vectors are stored in the storage device.

3. The method of claim 1, wherein computing the adjustment vector comprises determining adjustment vector values capable of adjusting the pulse response profile to more closely approximate the desired response trajectory.

4. The method of claim 1, wherein the step response profile is measured in response to seek control signals generated by a closed loop servo system.

5. The method of claim 1, wherein the desired response trajectory comprises a pulse response matrix including one vector column for each control signal generated to perform the seek operation, wherein each column comprises one measured pulse response.

6. The method of claim 5, wherein the desired response trajectory comprises a vector, wherein computing the adjustment vector comprises:
    determining a pseudo inverse of the pulse response matrix;
    determining a difference matrix having columns formed by subtracting the desired pulse response vector from each vector column in the pulse response matrix; and
    applying the difference matrix to the pseudo inverse pulse matrix to generate the adjustment vector including one value for each control signal generated to perform the seek operation.

7. The method of claim 1, wherein the steps of determining the step response profile, determining the desired response trajectory, computing the adjustment vector, and storing the adjustment vector are performed by a system coupled to the storage device.

8. The method of claim 1, wherein the steps of determining the step response profile, determining the desired response trajectory, computing the adjustment vector, and storing the adjustment vector are performed by logic implemented within the storage device when the storage device is initialized.

9. The method of claim 1, wherein the storage device includes a magnetic storage medium.

10. A method for generating control signals to perform a seek operation to move an Input/Output (I/O) mechanism to a location on a storage medium in a storage device, comprising:
    generating control signals to perform a seek operation;
    accessing an adjustment vector in the storage device to determine one adjustment value;
    adjusting the generated control signal with the determined adjustment value; and
    transmitting the adjusted control signal to move the Input/Output mechanism to the seek location on the storage medium.

11. The method of claim 10, wherein accessing the adjustment vector further comprises:
    accessing a first adjustment vector if the seek operation is for a short seek; and
    accessing a second adjustment vector if the seek operation is for a long seek.

12. The method of claim 11, further comprising:
    determining a difference vector comprising a difference of a settle response and a desired trajectory if the seek operation is for a long seek; and
    adjusting the generated control signal with the difference vector.

13. The method of claim 10, wherein the adjustment vector includes one adjustment value for each control signal generated to perform the seek operation.

14. The method of claim 10, wherein the control signals are generated by a closed loop servo system.

15. The method of claim 10, wherein the closed loop servo system adjusts the control signals based on a monitored Position Error Signal (PES).

16. A storage device, comprising:
a storage medium;
a memory device;
means for determining a step response profile and pulse response profile for the storage device in response to a series of signals generated to seek to a location on the storage medium;
means for determining a desired response trajectory for the storage device that optimizes seek performance;
means for computing an adjustment vector based on the pulse and step response profiles and the desired response trajectory to optimize the pulse response profile; and
means for storing the adjustment vector in the memory device for use during storage operations to apply to control signals generated to perform one seek operation with respect to the storage medium.

17. The system of claim 16, further comprising:
means for generating a first adjustment vector for a short seek; and
means for generating a second adjustment vector for a long seek, wherein the first and second adjustment vectors are stored in the memory device.

18. The system of claim 16, wherein the means for computing the adjustment vector determines adjustment vector values capable of adjusting the pulse response profile to more closely approximate the desired response trajectory.

19. The system of claim 16, wherein the desired response trajectory comprises a pulse response matrix including one vector column for each control signal generated to perform the seek operation, wherein each column comprises one measured pulse response.

20. A storage device, comprising:
an Input/Output (I/O) mechanism;
a storage medium, wherein the I/O mechanism is capable of seeking to locations on the storage medium;
means for generating control signals to perform a seek operation;
means for accessing an adjustment vector in the storage device to determine one adjustment value;
means for adjusting the generated control signal with the determined adjustment value; and
means for transmitting the adjusted control signal to move the Input/Output mechanism to the seek location on the storage medium.

21. The system of claim 20, wherein the means for accessing the adjustment vector further performs:
accessing a first adjustment vector if the seek operation is for a short seek; and
accessing a second adjustment vector if the seek operation is for a long seek.

22. The system of claim 21, further comprising:
means for determining a difference vector comprising a difference of a settle response and a desired trajectory if the seek operation is for a long seek; and
means for adjusting the generated control signal with the difference vector.

23. The system of claim 20, wherein the adjustment vector includes one adjustment value for each control signal generated to perform the seek operation.

24. An article of manufacture for initializing a storage device, wherein the article of manufacture causes operations to be performed, the operations comprising:
determining a step response profile and pulse response profile for a storage system in response to a series of signals generated to seek to a location in the storage system;
determining a desired response trajectory for the storage system that optimizes seek performance;
computing an adjustment vector based on the pulse and step response profiles and the desired response trajectory to optimize the pulse response profile; and
storing the adjustment vector in the storage device for use during storage device operations to apply to control signals generated to perform one seek operation.

25. The article of manufacture of claim 24, further comprising:
generating a first adjustment vector for a short seek; and
generating a second adjustment vector for a long seek, wherein the first and second adjustment vectors are stored in the storage device.

26. The article of manufacture of claim 24, wherein computing the adjustment vector comprises determining adjustment vector values capable of adjusting the pulse response profile to more closely approximate the desired response trajectory.

27. The article of manufacture of claim 24, wherein the step response profile is measured in response to seek control signals generated by a closed loop servo system.

28. The article of manufacture of claim 24, wherein the desired response trajectory comprises a pulse response matrix including one vector column for each control signal generated to perform the seek operation, wherein each column comprises one measured pulse response.

29. The article of manufacture of claim 28, wherein the desired response trajectory comprises a vector, wherein computing the adjustment vector comprises:
determining a pseudo inverse of the pulse response matrix;
determining a difference matrix having columns formed by subtracting the desired pulse response vector from each vector column in the pulse response matrix; and
applying the difference matrix to the pseudo inverse pulse matrix to generate the adjustment vector including one value for each control signal generated to perform the seek operation.

30. The article of manufacture of claim 24, wherein the steps of determining the step response profile, determining the desired response trajectory, computing the adjustment vector, and storing the adjustment vector are performed by a system coupled to the storage device.

31. The article of manufacture of claim 24, wherein the steps of determining the step response profile, determining the desired response trajectory, computing the adjustment vector, and storing the adjustment vector are performed by logic implemented within the storage device when the storage device is initialized.

32. The article of manufacture of claim 24, wherein the storage device includes a magnetic storage medium.

33. An article of manufacture for generating control signals to perform a seek operation to move an Input/Output (I/O) mechanism to a location on a storage medium in a storage device, wherein the article of manufacture causes operations to be performed, the operations comprising:
generating control signals to perform a seek operation;

accessing an adjustment vector in the storage device to determine one adjustment value;

adjusting the generated control signal with the determined adjustment value; and transmitting the adjusted control signal to move the Input/Output mechanism to the seek location on the storage medium.

34. The article of manufacture of claim 33, wherein accessing the adjustment vector further comprises:

accessing a first adjustment vector if the seek operation is for a short seek; and accessing a second adjustment vector if the seek operation is for a long seek.

35. The article of manufacture of claim 34, further comprising:

determining a difference vector comprising a difference of a settle response and a desired trajectory if the seek operation is for a long seek; and adjusting the generated control signal with the difference vector.

36. The article of manufacture of claim 33, wherein the adjustment vector includes one adjustment value for each control signal generated to perform the seek operation.

37. The article of manufacture of claim 33, wherein the control signals are generated by a closed loop servo system.

38. The article of manufacture of claim 33, wherein the closed loop servo system adjusts the control signals based on a monitored Position Error Signal (PES).

* * * * *